United States Patent

[11] 3,607,850

| [72] | Inventor | Homer P. Smith<br>Little Falls, N.J. |
|------|----------|--------------------------------------|
| [21] | Appl. No.| 814,450                              |
| [22] | Filed    | Apr. 8, 1969                         |
| [45] | Patented | Sept. 21, 1971                       |
| [73] | Assignee | The United States of America as represented by the Secretary of the Army |

[54] POLYMERS OF CONJUGATED FLUORINATED DIENES AND METHOD OF MAKING, USING AS THE CATALYST A RHODIUM SALT OR COMPLEX
1 Claim, No Drawings

[52] U.S. Cl. ...................................................... 260/87.5,
260/33.8, 260/92.1
[51] Int. Cl. ...................................................... C08f 3/20,
C08f 15/06
[50] Field of Search ............................................ 260/92.1,
87.5

[56] References Cited
UNITED STATES PATENTS

| 2,446,382 | 8/1948 | Mochel | 260/92.1 |
| 2,762,790 | 9/1956 | Greene | 260/92.1 |
| 2,917,498 | 12/1959 | Honn | 260/92.1 |
| 2,945,896 | 7/1960 | Tarrant et al. | 260/92.1 |
| 3,020,267 | 2/1962 | Barr | 260/92.1 |
| 3,116,269 | 12/1963 | Honn | 260/92.1 |
| 3,148,175 | 9/1964 | Barr | 260/92.1 |
| 3,202,643 | 8/1965 | Frisch et al. | 260/92.1 |
| 3,355,410 | 11/1967 | Dannelly et al. | 260/85.5 M |
| 3,379,773 | 4/1968 | Barr | 260/92.1 |

OTHER REFERENCES

Relyea et al., Chem. Abs., 68, (Feb. 6, 1968) pp. 22599h

*Primary Examiner*—Harry Wong, Jr.
*Attorneys*—Harry M. Saragovitz, Edward J. Kelly, Herbert Berl and Charles F. Murphy ABSTRACT: Method of polymerizing conjugated fluorinated dienes in aqueous emulsions wherein a rhodium salt or rhodium complex which is water-soluble catalyzes the polymerization and increases the conversion of the conjugated fluorinated dienes to polymers thereof.

POLYMERS OF CONJUGATED FLUORINATED DIENES AND METHOD OF MAKING, USING AS THE CATALYST A RHODIUM SALT OR COMPLEX

The invention described herein may be manufactured, used, and licensed by or for the Government for governmental purposes without the payment to me of any royalty thereon.

This invention relates to a method of polymerizing conjugated fluorinated dienes which are rubberlike, flexible at low temperatures, and resistant to mineral oils and other chemicals. More particularly, the invention relates to the use of rhodium salts or complexes as catalysts for the polymerization or copolymerization of conjugated fluorinated dienes to produce high molecular weight elastomers.

The preparation of synthetic high molecular weight rubbery polymers from dienes and substituted dienes, particularly butadiene-1,3 and derivatives thereof, such as chlorinated derivatives, has been known for many years. More recently it has been found that many fluorinated unsaturated monomers can be polymerized to produce high molecular weight rubbery polymers which in many cases retain their rubbery characteristics at extremely low temperatures, such as −40° F. or even lower, and which also possess high resistance to oils and various chemicals having strong solvent properties or ability to degrade high molecular weight substances.

One of the drawbacks to the commercial production of the fluorinated rubbery materials has been the relatively low reactivity of the fluorinated unsaturated monomers. Conventional catalyst systems, such as anionic coordination catalyst systems, have not been very effective for catalyzing the polymerization of conjugated fluorinated dienes.

It is an object of the present invention to provide a method of carrying out polymerization of conjugated fluorinated dienes to produce homopolymers as well as copolymers in high yields within relatively short reaction times.

Another object of the invention is to provide high molecular weight rubbery polymers of conjugated fluorinated dienes produced in accordance with the method of the invention.

Other objects and advantages will appear from the following description of several embodiments of the invention, and the novel features will be particularly pointed out hereinafter in connection with the appended claims.

The objects of the invention are accomplished by the emulsion polymerization of one or more conjugated fluorinated dienes in the presence of a rhodium salt or complex. The method is particularly effective with conjugated fluorinated dienes, such as 1, 1, 2-trifluorobutadiene; 1, 1, 2-trifluoro-3-chlorobutadiene; 2, 3-bis (trifluoromethyl) butadiene; hexafluorobutadiene; and 5, 5, 5-trifluoro-4-(trifluoromethyl) pentadiene-1, 3.

Rhodium salts or complexes which are soluble in water are effective as catalysts or initiators of the polymerization reactions of conjugated fluorinated dienes in emulsion systems. Rhodium trichloride trihydrate has been found to be especially effective, in several cases producing substantially complete conversion of the conjugated fluorinated diene monomer into high molecular weight rubbery polymers. A rhodium complex, bis (1, 4-cyclohexadiene) chlororhodium, has been found to be somewhat less effective than rhodium trichloride trihydrate, but compared to the more conventional catalysts of the prior art is, nevertheless, quite effective as a catalyst in polymerization reactions of conjugated fluorinated dienes.

For the purposes of this application, a conjugated fluorinated diene is a compound which contains two double bonds in an aliphatic chain of carbon atoms, the double bonds being separated by a single bond, the compound having at least one fluorine atom substituted in place of a hydrogen atom either in the aliphatic chain containing the conjugate, dougle-bonded carbon atoms or in a side chain linked to the aliphatic chain or in a ring structure linked to the aliphatic chain or in a ring structure linked to a carbon atom of a side chain linked to the aliphatic chain.

The following examples will illustrate the practice of the invention:

EXAMPLE I

A solution is formed from 7.0 milliliters of distilled water, 1 milliliter of 20 percent "Nacconol NRSF" (a sodium alkyl aryl sulfonate manufactured by Allied Chemical & Dye Corporation) and 0.020 grams of rhodium chloride trihydrate and is flushed with argon. 20.8 millimols of 1, 1, 2-trifluoro-3-chlorobutadiene are added as an air-free 31 percent by weight solution in benzene. The emulsion is then polymerized at 50° C. in an argon atmosphere for 65 hours. A tacky, rubbery polymer weighing 3.059 grams is isolated. This represents substantially 100 percent conversion of the monomer to polymer. The polymer is very smooth milling, is soluble in chloroform, and has a glass transition temperature of −17° C.

EXAMPLE II

An emulsion is prepared similar to that of example I, except in addition to the 1, 1, 2-trifluoro-3-chlorobutadiene, 22 millimols of 1, 1, 2-trifluorobutadiene are added from a vacuum line to the other ingredients in the frozen state at the sublimation point of dry ice. The reaction tube is resealed under nitrogen and the emulsion polymerized at 50° C. for 65 hours, after which 5.126 grams of a rubbery polymer are isolated representing approximately 97 percent conversion of the 1, 1, 2-trifluoro-3-chlorobutadiene and the 1, 1, 2-trifluorobutadiene to a copolymer which is slightly sticky and has a glass transition temperature of −26° C.

EXAMPLE III

One milliliter of a 20 percent aqueous solution of "Nacconol NRSF" is added to a solution of 0.020 gram rhodium chloride trihydrate in 7 milliliters of distilled water and the mixture flushed with argon. 3.65 ml. (25 millimoles) or argon-flushed 5, 5, 5-trifluoro-4-trifluoromethyl-1, 3-pentadiene is added to the mixture and the reaction tube sealed. 22 millimoles of 1, 1, 2-trifluorobutadiene is then added from a vacuum line to the dry ice-frozen reaction tube and the tube resealed under nitrogen. The emulsion is polymerized for 64 hours, after which 6.44 grams of a tough white rubbery polymer are isolated representing approximately 91 percent conversion of the 5, 5, 5-trifluoro-4-trifluoromethyl-1, 3-pentadiene and the 1, 1, 2-trifluorobutadiene to a copolymer which swells in chloroform, has a glass transition temperature of −17° C., and has a melting temperature of 103° C.

EXAMPLE IV

In a reaction tube are mixed 0.05 grams of bis (1, 4-cyclohexadiene chlororhodium), 13.0 milliliters of distilled water, 2.5 milliliters of 20 percent "Nacconol NRSF," 5 milliliters of formic acid and the solution flushed with argon. There are added 25 millimols of argon-flushed 5, 5, 5-trifluoro-4-trifluoromethyl-1, 3-pentadiene. The tube is frozen with dry ice. 22 millimoles of 1, 1, 2-trifluorobutadiene are added from a vacuum line. The tube is warmed and the emulsion polymerized at 50° C. for 65 hours, after which 2.508 grams of a tough brown rubbery polymer are isolated representing approximately 42 percent conversion of the monomers to a copolymer which has a glass transition temperature of 2° C. and a melting temperature of 108° C.

EXAMPLE V

In a reaction tube 0.020 grams of rhodium chloride trihydrate are dissolved in 15 milliliters of distilled water and 2.0 milliliters of "Nacconol NRSF" are added. The solution is flushed with argon, sealed and frozen with dry ice. From a vacuum line are added 22 millimoles of hexafluorobutadiene and 22 millimoles of 1, 1, 2-trifluorobutadiene. The tube is resealed under nitrogen and pressured with nitrogen. The tube is warmed and the emulsion is polymerized at 50° C. for 385 hours, after which 2.782 grams of a rubbery polymer are isolated representing approximately 47 percent conversion of the monomers to a copolymer which has a glass transition temperature of −34° C.

Other rhodium salts or complexes than rhodium trichloride trihydrate or bis (1, 4-cyclohexadiene chlororhodium) may be used as catalysts for the polymerization of conjugated fluorinated dienes in emulsion polymerizations in accordance with the present invention, provided they are water-soluble. Rhodium sulfate, for example, may be used to catalyze the emulsion polymerization reactions of this invention.

Other emulsifying agents than "Nacconol NRSF" may be employed in preparing the emulsions of the conjugated fluorinated diene monomers for polymerization.

Numerous conjugated fluorinated dienes other than those mentioned above may be homopolymerized, or may be copolymerized with other polymerizable unsaturated compounds, which are not required to contain fluorine, in accordance with the method of the invention to produce useful rubbery polymers having desirable properties, particularly low-glass transition temperatures and resistance to common solvents and to chemicals which are destructive to many other types of polymers. Copolymers comprising conjugated fluorinated dienes as monomers have been prepared having glass transition temperatures as low as −53° C.

The homopolymers and copolymers prepared from conjugated fluorinated dienes in accordance with the present invention are very useful as elastomers for uses involving low temperatures, such as 0° F. to −40° F. or even lower. This is of great importance to the Armed Forces which sometimes are required to operate at low temperatures with mechanical equipment requiring elastomeric materials such as gaskets, diaphragms, and even tires for vehicles. These polymers are also very useful in handling very corrosive chemicals or powerful solvents since they will in most cases be only slightly affected and, therefore, will have long periods of usefulness in such equipment. They are also useful as parts of protective clothing for protecting personnel who have to work with very corrosive chemicals.

I wish it to be understood that I do not desire to be limited to the exact details described, for obvious modifications will occur to a person skilled in the art.

I claim:

1. In a method of forming a rubbery polymer from an aqueous emulsion comprising hexafluorobutadiene and 1, 1, 2-trifluorobutadiene, the improvement which comprises the step of reacting said hexafluorobutadiene with said 1, 1, 2-trifluorobutadiene in the presence of rhodium chloride trihydrate in sufficient quantity to increase the conversion of said hexafluorobutadiene and said 1, 1, 2-trifluorobutadiene to a copolymer thereof.